Feb. 2, 1971     R. G. CERIONI     3,559,372
APPARATUS FOR GRIPPING AND STRETCHING THE MOUTH OF SACKS
AND SIMILAR NONRIGID CONTAINERS IN PREPARATION
FOR THEIR SEALING BY SEWING
Filed Sept. 19, 1968     2 Sheets-Sheet 1

Feb. 2, 1971   R. G. CERIONI   3,559,372
APPARATUS FOR GRIPPING AND STRETCHING THE MOUTH OF SACKS
AND SIMILAR NONRIGID CONTAINERS IN PREPARATION
FOR THEIR SEALING BY SEWING
Filed Sept. 19, 1968   2 Sheets-Sheet 2

United States Patent Office 3,559,372
Patented Feb. 2, 1971

3,559,372
APPARATUS FOR GRIPPING AND STRETCHING THE MOUTH OF SACKS AND SIMILAR NONRIGID CONTAINERS IN PREPARATION FOR THEIR SEALING BY SEWING
Renzo Giuseppe Cerioni, Corso Venezia 10, Milan, Italy
Filed Sept. 19, 1968, Ser. No. 760,878
Claims priority, application Italy, Oct. 13, 1967, 21,589/67, Patent 815,384
Int. Cl. B65b 65/00, 7/06, 61/00
U.S. Cl. 53—393                 10 Claims

ABSTRACT OF THE DISCLOSURE

Apparatus for ripping the mouth of sacks and other nonrigid containers in order to stretch and flatten it, in preparation for a sealing operation.

---

This invention relates to an improvement in the apparatus which mechanically and in particular automatically carries out the operations necessary for arranging the mouth of sacks and other nonrigid containers in preparation for sealing, especially by sewing. In particular, this invention refers to an improvement in apparatus basically of the type described in Italian Pat. No. 646,895 of the same applicant, which mechanically grips the mouth of the sacks on the inside at diametrically opposed points and by means of a movement of withdrawal of the gripping members it stretches and flattens the mouth in a plane coinciding with the direction in which the mouth is to be transported, this transporting being accomplished by suitable mechanical transporters driven by the sewing machine used to seal the sacks.

The object of this invention is to provide apparatus of the type and for the use stated, which is so improved as to increase its performance, improve its operational reliability and to obtain further important technical and working advantages, particularly regarding the suitability of the apparatus for manipulating the mouth of the sacks, the dimensions of which can vary within wide limits, as can their elastic properties.

Fundamentally, the improved apparatus according to the invention, comprises a structure which moves in the direction of transport of the sacks and carries a mechanical system for actuating rods or parallel bars which form the members for gripping, widening and stretching the mouth of the sacks, and which are controlled so as to undergo the necessary cyclic movements of lowering the mouth, spacing for the stretching and release and return to the initial position of the cycle. The invention is characterized by the inclusion of means for selectively controlling the different movements which are to be effected cyclically, both the movements of lowering and widening being actuated by elastic means which are controlled by the withdrawal members, and which takes place on the attainment of a determined position in the movement of the said structure based upon the position which the sacks have reached in their transporting. The arrangement is such that the operations are carried out in phase with the transporting of the sacks, and the degree of spacing adapts itself elastically in line with the possible degree of stretch of the mouths for the different cases.

According to a further characteristic of the improvement, the apparatus is driven by means of suitable motors controlled by engaging and disengaging devices interlocked with means for signaling the arrival of the individual sacks in the position where their mouths can be engaged by the said apparatus, which stops whenever its parts return to the starting position. In this way it is possible to obtain a completely automatic apparatus which is independent of the frequency with which the sacks arrive and the spacing between them, and also to a large extent independent of the width of the mouths.

Moreover the apparatus can be provided with regulating means which adapts it to sacks of widely differing dimensions according to the case under consideration.

Furthermore, the said motors are either provided with a means of transmission able to make the driven parts operate selectively at different speeds, or they are made in such a way that they can operate at various speeds, and the engagement and disengagment devices for these motors and/or transmission units comprise suitable means for ensuring that the start position return phase is effected at a higher speed than that used for holding and transporting the individual sacks. This characteristic fully allows the return times to be kept to a minimum and, therefore, successive operation with sacks spaced very close to each other.

The principles of the present invention, in which the solution of technical problems pertaining to the achievement of the above mentioned and other purposes and objects of the invention can clearly be seen, together with preferred examples for implementing the means and devices included in the improved appliance, will become obvious from the following detailed description of the form advised for assembling the appliance, as shown on the enclosed drawings, in which.

Figure 1:
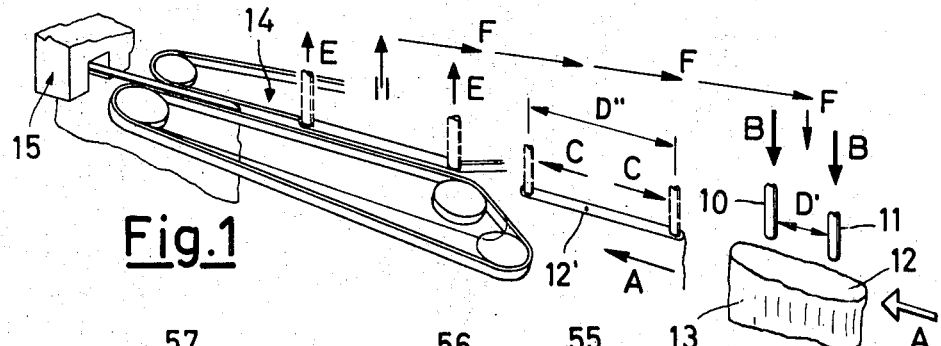
FIG. 1 shows schematically the functions of the device, so that the following can be more readily understood.

As shown in FIG. 1, an apparatus of the type under consideration has to engage, through a pair of vertical parallel rods 10 and 11 the mouth 12 of sack 13; which is being fed in direction A towards, for example, a conveyor, or similar, so as to distend the mouth, on a vertical plane lying in the feed path, and pass the distended mouth to the conveyor action 14 and thence on to stitching machine 15 which seals the sack.

This is made possible by imparting to rods 10 and 11, set at close distance D' so that they both positively engage the sack mouth 12, a lowering movement B and thus, once the rods have fully engaged in the mouth, a spacing movement C, while the rod unit assists in forward movement A of the sack. The mouth which takes on distended shape 12′, as a result of spacing D″ adopted in turn by the rods, is moved along in this fashion until it engages the conveyor 14 which then takes over from the apparatus to keep the mouth distended and flattened while it is transported to machine 15. Once this occurs, the rods move upwards vertically E and are returned to the start position, with the return movements being as shown by arrows F.

It has been seen that to obtain the best results from the apparatus, it is necessary for the lowering operation B to be rapid, and if possible instantaneously, effected with the timing to fully match feed A of the sacks. It is also necessary for spacing C to be in line with the spacing or distance D″ between the rods, for the actual dimensions of each individual sack. Finally all movements must be perfectly clear cut and in agreement with the movement of each individual sack. These contingencies are provided for by the apparatus as shown for example purposes in FIGS. 2 to 5.

As its main structural component, this apparatus comprises structure 20 which is generally in the form of a vertical plate, horizontally movable, by means of grooved cord pulleys 21 and 22, along fixed bars 23 and 24 respectively, supported by rear fixed structure 25. The horizontal alternating movements of unit 20, required to assist feed A of the sack and to obtain a return to the start position, are generally achieved through mechanical drives including a chain around gears 26 and 27 which are identical, rotate in direction G and are arranged on the same level so that the chain moves, in top part 28 and bottom part 29 which are parallel and horizontal, in opposite directions coinciding with feed A and also at its same speed.

Furthermore, out of preference, at least one of the sprockets on the chain, 26 for example, is carried in a horizontally moveble way on the apparatus structure so as to allow the chain tension to be adjusted, replaced or even shortened in order to adapt the machine to the various movement widths of the unit which handles the sack mouths and distends them.

In order to obtain the working and return movement sequences, at the normal and faster speeds, respectively, the chain can furthermore be provided with suitably positioned flanges or screws, which are able to enter sequentially in contrast with the feeler units which, by means of suitable micro switches, operate the motor control circuits, or better still, electromagnetic clutches able to change the transmission over between two different ratios.

This movement is transmitted to structure 20 through pin 30, fixed to one of the chain links and connected to block 32 which slides vertically in vertical guide slot 33, running through structure 20. This pin 30 together with block 32, therefore, moves downwards and upwards, respectively, during the travel of the chain link down around gear 27 and up around gear 26, i.e., at the beginning and the end of the movement in direction A.

By means of pairs of rods or top 40 and bottom 41 guide bars which through grooved cord pulleys 42 and 43, respectively, engage in structure 20 there are two symmetrical members mounted in such a way as to allow them to move horizontally in opposite directions, and these each comprise a tubular rod 44 from which rod 10 and rod 11, which engage the mouth of the sacks, can be moved downward. These rods 10, 11 are returned to the downward position by springs 45 and are held in their raised position (FIG. 2) by plate 46 which, by using a special mechanism, can be moved away at will.

Tubular rods 44 are, furthermore, linked by springs 47 to the end of arms 48, pivoted at 49 to structure 20 and integral with levers 50 which, through other levers 51, pivoted at 52 to the same structure 20, engage with pin 53 carried by vertical sliding part 54 which, in turn, consists of cam follower roller 55 which, following the movement in direction A of structure 20, can engage and move on to sloping plane 56 supported by fixed bar cam 57.

The movement width given to levers 51, 50 and 48, and therefore the spacing given to tubular rods 44 depends on the width of the vertical movement of part 54. In order to make the apparatus suitable to operate with sacks of widely differing dimensions, there are devices provided to modify these widths, e.g., cam 57 can have its height altered. Out of preference, needle bearing 55 is supported by means of an eccentric or some other equivalent device able to modify its vertical position as compared with that of part 54, with everything in such a way as to vary the vertical spacing between the highest point of sloping plane 56 and the point at which the engagement occurs between the needle bearing and the sloping plane.

Figure 2:
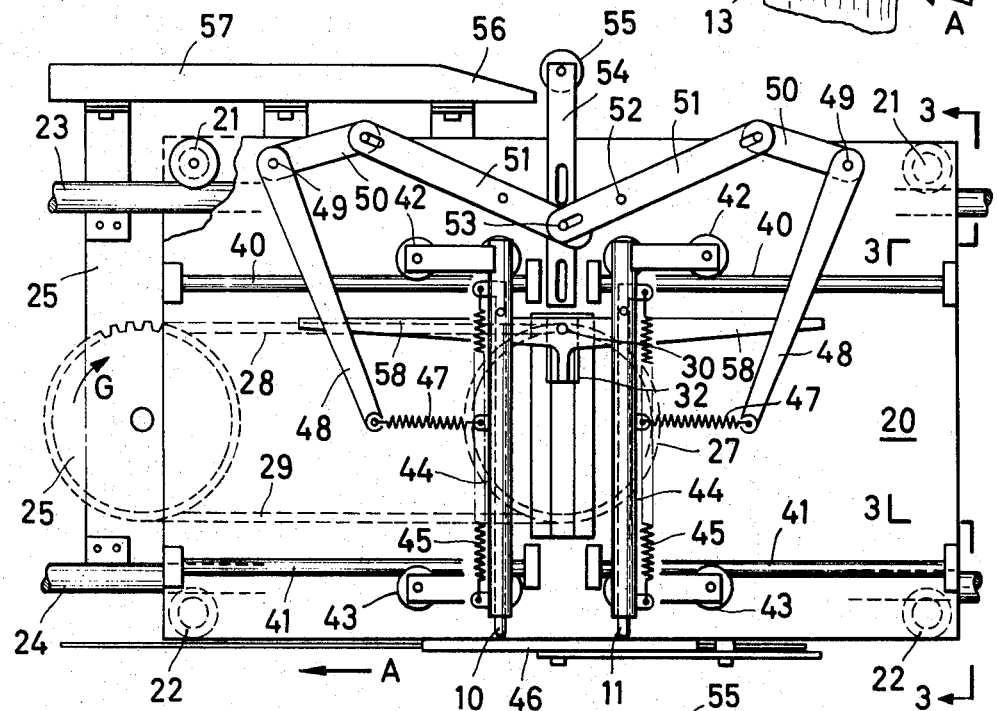
FIG. 2 is a front view of the apparatus, in the start position of the operational cycle.
Figure 3:
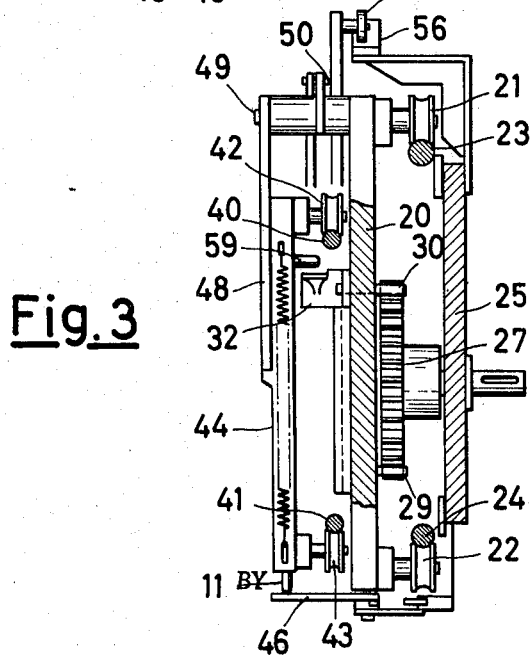
FIG. 3 is a side view, partly in section, of the apparatus, on the line shown as 3—3 in FIG. 2.

The start and rest positions of the apparatus are shown in FIGS. 2 and 3. Part 54 is lowered since needle bearing 55 is disengaged from bar cam 57, and tubular rods 44 are brought together. Block 32, integral with the two arms 58 which extend transversely, is in the raised position and, by means of the small pins 59 (FIG. 3), maintains rods 10 and 11 raised, although they are prevented from falling by plate 46, opposing springs 45.

Figure 4:
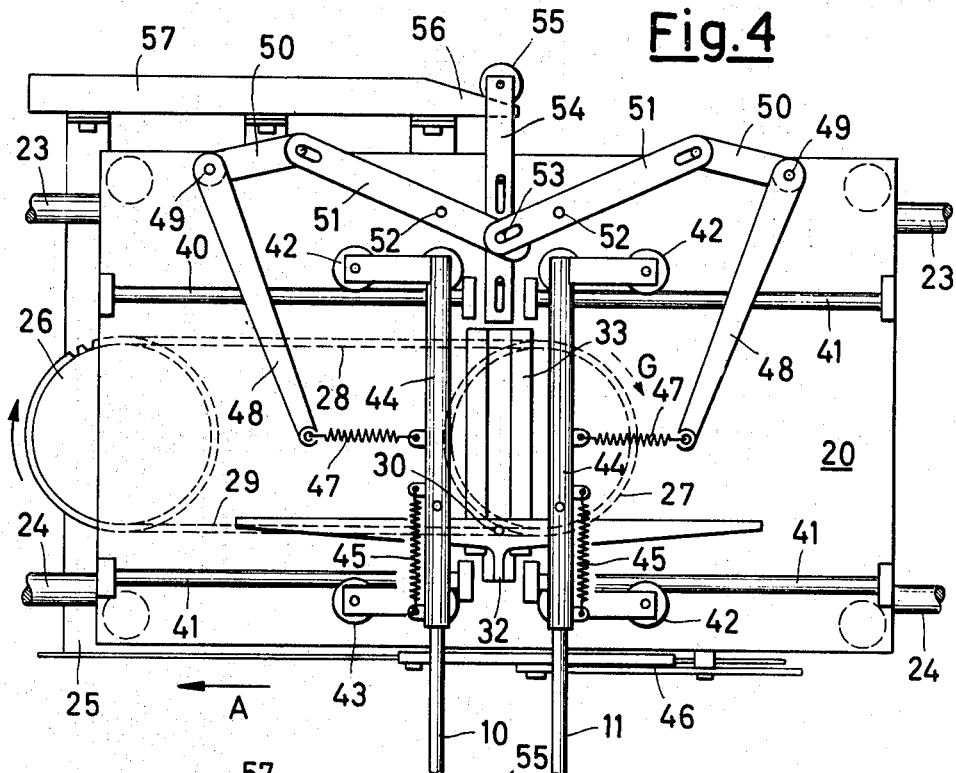
FIGS. 4 and 5 show the device in FIG. 2, at the end of the rod lowering stage and in the stretching phase.

Following the movement, on the part of pin 30 in the downward sweep around gear 27, block 32 and arms 58 are lowered into the position shown in FIG. 4, but rods 10 and 11 remain held in the raised position by plate 46. Once the precise position relevant to the apparatus and the sack has been reached, plate 46 is moved away and rods 10 and 11 are instantaneously lowered by springs 45 into the mouth below, while structure 20 also moves in direction A, since the chain link carrying pin 30 travels along the lower horizontal part.

Figure 5:
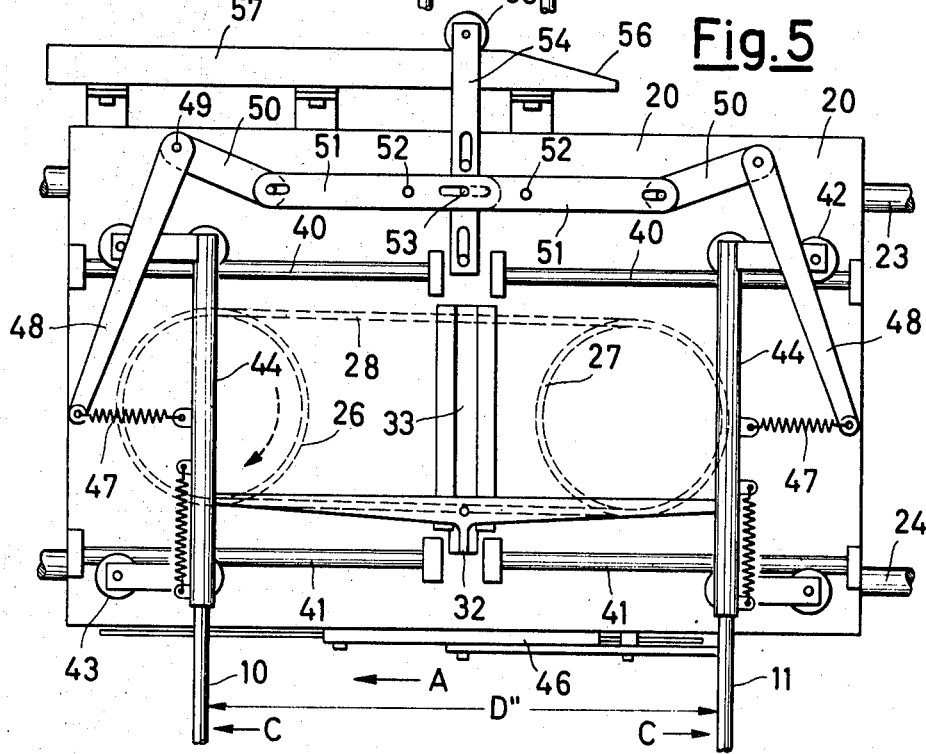

As a result of movement A of the unit, needle bearing 55 engages sloping plane 56 (FIG. 4) and, while raising itself it pulls part 54 upwardly which, as is shown in FIG. 5, divides by means of levers 50 and 51, arms 48 which, through springs 47 cause tubular elements 44 to travel in the opposite direction along bars 40 and 41, thereby causing the desired spacing of rods 10 and 11. The width of the space produced is limited by the maximum distension of the mouth of the sack, for which the energy is limited by the flexible resistance of springs 47, in such a way that the mouth remains well distended, without any excessive strain, even though between one sack and another there may be a noticeable difference in size. It is obvious that the lever and mechanism system described above is dimensioned so as to ensure, in the absence of pull, spacing C up to D" with sufficient over play and above the amount required for the distension of the mouths of sacks of the maximum foreseeable size, while the difference between this spacing and the one actually reached is absorbed by the elastic give of springs 47.

Once pin 30 has completed its travel around the lower part 29 of the chain, it goes upwards again following the rise around gear 26 and, with the help of arms 58 returns rods 10 and 11 to the upright position. Structure unit 20 is carried back to the start position shown in FIG. 2 through the return movement ensured by the chain passing along top part 28, while plate 46 is once again placed above rods 10 and 11 so as to reestablish all the above described start conditions.

It is obvious that the various structural details and the individual members in the improved device can undergo numerous variations and modifications without deviating from the scope of the invention.

What is claimed is:

1. Apparatus for gripping the mouth portion of a bag, said apparatus comprising stationary support means, movable support means supported on said stationary support means, driving means for moving said movable support means relative to said stationary support means, a pair of gripper support members slidably supported on said movable support means for opposing movement in cooperation with one another, a pair of gripper members slidably supported in said gripper support members respectively, means for imparting opposing movement to said pair of gripper support members to selectively space said gripper support members over a distance corresponding to the maximum dimension of said mouth portion of said bag, biasing means for urging said gripper members to slidably extend from said gripper support members, and control means for maintaining said gripper members at rest in opposition to said biasing means and for selectively freeing said gripper members to instantaneously slidably extend from said gripper support members and project into said mouth portion of said bag to grip same.

2. Apparatus as claimed in claim 1, including means for returning said gripper members to rest in opposition to said biasing means.

3. Apparatus as claimed in claim 2, wherein said stationary support means includes a pair of spaced parallel bars, and said movable support means includes a plurality of rollers for rolling on said bars.

4. Apparatus as claimed in claim 2, wherein said driving means includes a pair of spaced pulleys supported on said stationary support means and a belt interconnecting said pulleys, said belt including a pin, said movable support means having a groove along which said pin is slidable for driving said movable support means.

5. Apparatus as claimed in claim 1, wherein said movable support means includes a pair of spaced parallel bars, and said gripper support members include a plurality of rollers for rolling on said bars.

6. Apparatus as claimed in claim 5, wherein said gripper support members each includes a sleeve parallel to the other, and said gripper members are each constituted by a rod slidably supported in said sleeves.

7. Apparatus as claimed in claim 6, wherein said biasing means includes a pair of springs connecting respectively each said sleeve to each said rod.

8. Apparatus as claimed in claim 1, wherein said means for imparting opposing movement to said gripper support members includes a camming surface connected to said stationary support means, and a cam follower connected to said movable support means.

9. Apparatus as claimed in claim 8, wherein said means for imparting opposing movement to said gripper support members further includes a plurality of operatively associated links, and a pair of springs respectively interconnecting said links with each of said gripper support members.

10. Apparatus as claimed in claim 4, wherein said means for returning said gripper members to rest comprises a member connected to said pin for movement therewith and including a pair of arms, said gripper support members each including a projection engageable by said arms to be carried thereby.

References Cited

UNITED STATES PATENTS

| | | | |
|---|---|---|---|
| 2,114,622 | 4/1938 | Bergstein | 53—373 |
| 3,241,290 | 3/1966 | Ingleson et al. | 53—371 |

FOREIGN PATENTS

| | | | |
|---|---|---|---|
| 646,895 | 10/1962 | Italy | 53—371 |

THERON E. CONDON, Primary Examiner

R. L. SPRUILL, Assistant Examiner

U.S. Cl. X.R.

53—139, 371